Nov. 12, 1940.  R. A. BAUDRY  2,221,567

TURBOGENERATOR ROTOR

Filed Feb. 17, 1938

WITNESSES:
N. F. Susser
F. P. Lyle

INVENTOR
René A. Baudry.
BY O. B. Buchanan
ATTORNEY

Patented Nov. 12, 1940

2,221,567

UNITED STATES PATENT OFFICE 2,221,567

TURBOGENERATOR ROTOR

René A. Baudry, Pittsburgh, Pa., assignor to Westinghouse Electric & Manufacturing Company, East Pittsburgh, Pa., a corporation of Pennsylvania Application February 17, 1938, Serial No. 191,008

1 Claim. (Cl. 171—252)

The present invention relates to the rotor construction of large high-speed turbogenerators and, more particularly, to means for ventilating the windings of such rotors.

Turbogenerators are, in most cases, machines of large size and operate at high speeds, usually either 1800 or 3600 revolutions per minute. The rotors of such machines are usually of much greater length than diameter, and as a result of this construction they tend to become overheated more rapidly than other parts of the machine and present a difficult problem of cooling. The field windings usually consist of copper conductors placed in longitudinal slots in the rotor, and if no special provision is made for cooling them, the heat generated in these conductors flows through the body of the rotor to the air gap or to ventilating ducts which may be provided in the rotor core. A considerable increase in the effectiveness of ventilation can be obtained by directly cooling the rotor conductors, and this has been done in some cases by providing grooves in the sides or bottoms of the slots for the circulation of a cooling medium. With this arrangement, however, it is necessary to provide supporting or bracing means for the conductors which prevents direct contact between the cooling medium and the copper, and the provision of such grooves also involves additional machining operations which increase the cost of the rotor. More effective cooling may be obtained if the cooling medium is permitted to flow in direct contact with the copper conductors, and this is especially advantageous when hydrogen is used as the cooling medium.

The object of the invention, therefore, is to provide improved ventilation for turbogenerator rotors.

A more specific object is to provide a rotor construction in which a gaseous cooling medium is permitted to flow in direct contact with the rotor conductors, thereby greatly improving the ventilation.

These results are obtained by arranging the conductors in each slot along its opposite sides so as to leave an open space between them which forms a ventilating duct extending longitudinally in the center of the slot and the cooling medium is permitted to flow through this duct in direct contact with the conductors. Strips of copper or similar material of good heat conductivity are provided between adjacent conductors and extend transversely across the slot and longitudinally throughout its length. These strips are secured to the conductors and serve as bracing members to support them in position against centrifugal and other forces, and also act as cooling fins to facilitate the transfer of heat from the conductors to the cooling medium.

The invention will be more fully understood from the following detailed description taken in connection with the accompanying drawing, in which.

Figure 1:
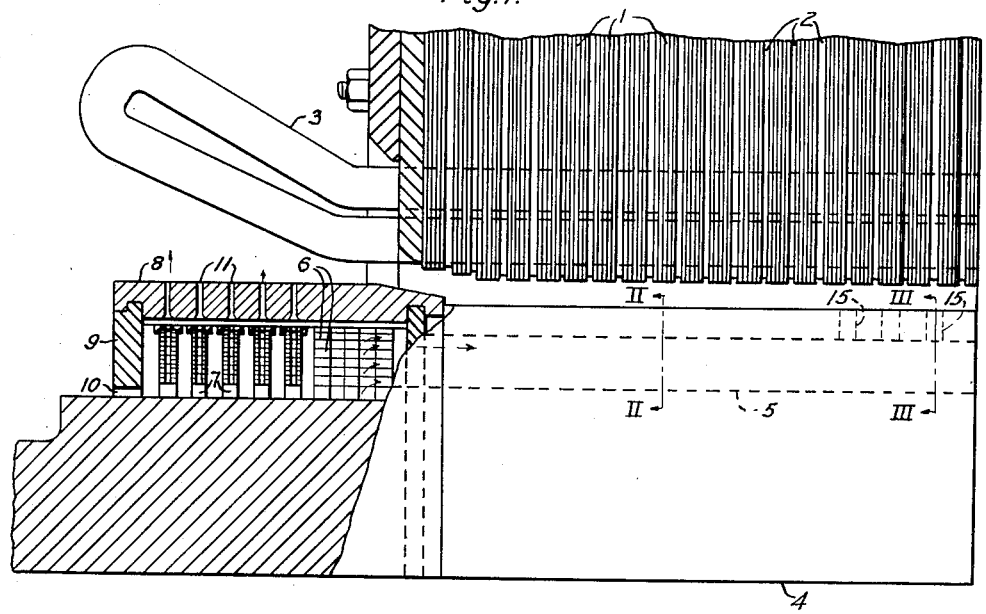
Figure 1 is a fragmentary longitudinal view partly in section of a large turbogenerator.

The invention is shown in Figure 1 as applied to a machine which has a stator core 1 composed of annular laminations assembled together in groups or stacks with radial ventilating ducts 2 therebetween. Suitable slots are provided in the core 1 for the reception of the coils 3 of a polyphase armature winding of any desired type.

The machine also has a rotor which consists of a cylindrical core member 4 having a plurality of longitudinal slots 5 formed therein for the reception of conductors 6 constituting the coil sides of the field winding. The conductors extend outwardly from the core to end connections 7 which are held in place by a retaining ring 8 and an end plate 9. Apertures 10 are provided in the end plate to permit the entrance of a suitable gaseous cooling medium which may be either air or hydrogen. As more fully explained below, part of the cooling medium flows through the end connections 7 to cool them and escapes through apertures 11 formed in the retaining ring, while the rest of the cooling medium flows longitudinally into the slots for the purpose of cooling the conductors contained therein.

Figure 2:
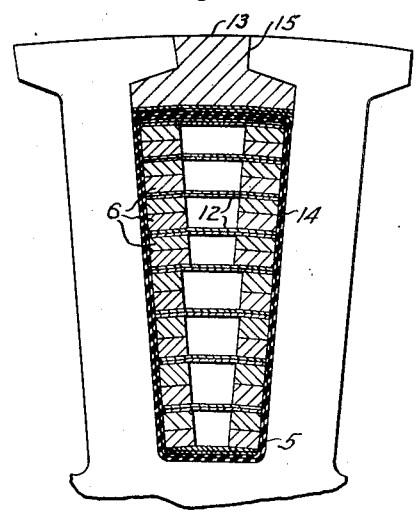
Figs. 2 and 3 are fragmentary transverse sections through the rotor, approximately on the lines II—II and III—III of Fig. 1, showing the arrangement of conductors in the slots.
Figure 3:
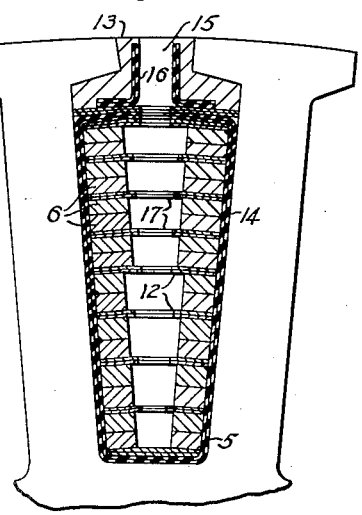

The arrangement of the conductors 6 within the slots is more clearly shown in Figs. 2 and 3 from which it will be seen that the conductors in each slot are disposed in superposed relation and are placed along the opposite sides of the slot, leaving an open space between them which extends longitudinally for the entire length of the slot. Preferably, two different widths of conductors are used, according to the customary practice, because of the changing width of the slot, and, if desired, a stepped slot having parallel sides may be used. In order to hold the conductors in position against the action of the centrifugal and other forces to which they are subjected during operation of the machine, strips 12 of copper or other suitable material of good heat conductivity are placed between adjacent conductors and extend transversely across the slots and longitudinally for their full length. These strips are secured to the conductors and serve as bracing members to hold them in place and also, because of their good heat conducting properties, they act as cooling fins to facilitate the transfer of heat from the conductors to the cooling medium. The slot is closed at the top by a wedge 13, which is preferably made of a non-magnetic material of good heat conductivity, such as aluminum, and a slot liner or cell 14 of mica or other suitable material is provided to insulate the conductors 6 from the rotor core.

The cooling medium enters the slots at their ends, as stated above, and flows longitudinally through the ducts provided between the conductors so that it is in direct contact with the copper, thus providing the most effective cooling. To permit escape of the cooling medium, a radial duct 15 is provided in each slot near the center of the rotor which is preferably in the form of a radial hole drilled in the wedge 13 and provided with a bushing 16 of suitable material. Holes 17 corresponding in position to the duct 15 are provided in the strips 12 to permit the escape of the cooling medium which thus flows longitudinally through the slots from the ends of the rotor to the center where it is discharged into the air gap. If desired, or necessary, two or more radial ducts 15 may be used. The strips 12 are preferably extended beyond the end of the rotor core and through the end connections 7 as shown in Fig. 1. A series of holes similar to the holes 17 is provided in these strips outside the core in order to permit the cooling medium to enter the spaces between them and flow into the slots and through the end connections as described above.

Figure 4:
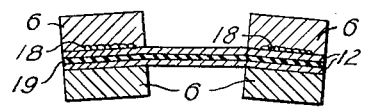
Fig. 4 is a view on a larger scale, showing certain details of construction.

The arrangement of the conductors 6 and copper strips 12 is more clearly shown in Fig. 4, from which it will be seen that the conductors are arranged in pairs, the two members of each pair being on opposite sides of the slot, and that the strip 12 for these two conductors is secured to them by welding or brazing, or in any other suitable manner, as indicated at 18. In assembling the conductors in the slot, each pair of conductors with its associated strip 12 is placed in position on top of the preceding pair and adjacent pairs of conductors are inverted with respect to each other. A thin layer of insulation 19 is provided between the adjacent strips 12 to insulate the conductors from each other.

It will be seen that with this construction, the cooling medium is permitted to flow through the slots in direct contact with the conductors therein so as to obtain the maximum cooling effect, and the necessary support for the conductors is obtained by the strips 12 which serve as bracing members but which do not interfere with the free flow of the ventilating medium. Because of their good heat conductivity these strips also act as fins to assist in the dissipation of heat. It will also be seen that this construction is relatively simple and inexpensive as compared to the provision of grooves in the sides or bottom of the slots, which require additional machining operations to produce them. By the use of the present construction, the effectiveness of cooling is materially increased, especially if hydrogen is used as a cooling medium, and a significant increase in the rating of a generator of given dimensions can be obtained.

Although a specific embodiment of the invention has been illustrated and described, it is to be understood that it is not limited to the exact details of construction shown, but in its broadest aspects it includes all modifications and embodiments which come within the scope of the appended claim.

I claim as my invention:

A rotor for a dynamo-electric machine having a slotted core portion, a plurality of conductors in each of the slots, the conductors being arranged in each slot in superposed pairs with the conductors of each pair lying along opposite sides of the slot to provide a longitudinally extending duct between them, a strip of material of good heat conductivity secured to both conductors of each pair and extending transversely across the slot and longitudinally for its entire length, and wedges closing the slots and having radial ducts near the center of the rotor communicating with the longitudinal ducts.

RENÉ A. BAUDRY.